United States Patent
Ward et al.

(10) Patent No.: US 7,818,256 B1
(45) Date of Patent: Oct. 19, 2010

(54) DIGITAL RECEIPT FOR ELECTRONIC DATA AND METHODS AND SYSTEMS FOR GENERATING SAME

(75) Inventors: Hilary L. Ward, Princeton Junction, NJ (US); Francis A. Shanahan, Watchung, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 12/292,504

(22) Filed: Nov. 20, 2008

(51) Int. Cl.
*G06F 17/60* (2006.01)
*H04L 9/00* (2006.01)

(52) U.S. Cl. .............................. 705/51; 705/76; 705/64
(58) Field of Classification Search .................. 705/51, 705/70; 715/229
See application file for complete search history.

(56) References Cited

U.S. PATENT DOCUMENTS

| | | | |
|---|---|---|---|
| 7,194,426 B1* | 3/2007 | Box | 705/26 |
| 7,451,116 B2* | 11/2008 | Parmelee et al. | 705/50 |
| 2001/0018739 A1* | 8/2001 | Anderson et al. | 713/176 |
| 2003/0135740 A1* | 7/2003 | Talmor et al. | 713/186 |
| 2004/0078337 A1* | 4/2004 | King et al. | 705/51 |
| 2004/0230891 A1* | 11/2004 | Pravetz et al. | 715/511 |
| 2009/0037340 A1* | 2/2009 | Hitchen et al. | 705/76 |

* cited by examiner

*Primary Examiner*—Evens J Augustin
(74) *Attorney, Agent, or Firm*—King & Spalding LLP (57) ABSTRACT

Digital receipts for electronic data and computer-implemented methods and systems for creating such digital receipts involve, for example, generating a visual representation of the electronic data in a pre-defined format that visually represents the data without requiring that the represented data be embedded in the format, computing a mathematical representation of the electronic data and associating the mathematical representation of the electronic data with the visual representation of the electronic data, and receiving a user's digital signature on the associated visual and mathematical representations of the electronic data to evidence the user's approval of the represented electronic data.

7 Claims, 8 Drawing Sheets

DIGITAL RECEIPT FOR ELECTRONIC DATA AND METHODS AND SYSTEMS FOR GENERATING SAME

The present invention relates generally to the field of electronic documents, and more particularly to digital receipts for electronic data and methods and systems for creating digital receipts for electronic data.

BACKGROUND OF THE INVENTION

The traditional way of recording a signature against a set of data is to place the data in a document whereby the user can view the data in its entirety and sign the document using a digital certificate to indicate approval. Typically, a set of records to be processed includes a large amount of data, and the files storing such data are consequently correspondingly large in size. There is a need for methods and systems for creating digital receipts that enable a substantial reduction in the size of such records, while at the same time providing a non-repudiatable, legally binding obligation of a user who digitally signs the records to indicate approval.

SUMMARY OF THE INVENTION

It is a feature and advantage of the present invention to provide digital receipts for electronic data in which a "digital hash" is inserted between what a user digitally signs and the data that is actually processed, such that the user signs an exact mathematical representation of the data that is processed.

It is a further feature and advantage of the present invention to provide methods and systems for creating digital receipts in which the user digitally signs a visual representation of data along with a mathematical representation of the data and engages in a sequence of verifications through which the signed visual and mathematical representations of the data can be tied back to the data that is actually processed. The hash is intended to be equivalent in a legally binding sense to having the user sign the original data.

It is an additional feature and advantage of the present invention to provide methods in which a digital receipt or representation of certain transactions is created, and an approval in the form of a digital signature against that receipt is thereafter captured, in an end-to-end process that establishes non-repudiation and proof at any given point that the data approved has not been tampered with throughout the process chain.

To achieve these and other advantages, embodiments of the present invention employ computer hardware and software, including, without limitation, instructions embodied in program code encoded on machine readable medium, to provide digital receipts for electronic data and methods and systems for creating such digital receipts that involve, for example, (i) generating a visual representation of the electronic data in a pre-defined format that visually represents the data without requiring that the represented data be embedded in the format, (ii) computing a mathematical representation of the electronic data and associating the mathematical representation of the electronic data with the visual representation of the electronic data, and (iii) receiving a user's digital signature on the associated visual and mathematical representations of the electronic data to evidence the user's approval of the represented electronic data.

According to embodiments of the invention, generating the visual representation of the electronic data involves, for example, receiving transaction data from an external party, such as payment instructions from a payments module, for processing for a user. The payment instructions can consist, for example, of any one or more of wire transfers, ACH transfers, or checks from the payments module.

Certain embodiments of the invention involve generating the visual representation of the electronic data in PDF format. In other embodiments, computing the mathematical representation of the electronic data involves computing the mathematical representation of the electronic data exclusively on invariant attribute fields. In other embodiments, computing the mathematical representation of the electronic data involves computing a transaction hash value for each of a plurality of transactions in the electronic data and associating the transaction hash value with a unique identifier.

Computing the mathematical representation of the electronic data in additional embodiments involves computing a group level hash value on the transaction hash value and the unique identifier. The group level hash is computed on all rows of transaction data (e.g., assuming 100 rows of transaction data are received, the group level hash is computed on the 100 rows of data received). In still other embodiments, associating the mathematical representation of the electronic data with the visual representation of the electronic data involves generating a form in the pre-determined format to include the group level hash and the unique identifier and associating the form with the visual representation of the electronic data.

Certain further embodiments involve receiving the user's digital signature on a form in the pre-determined format, such as PDF format, which includes the mathematical representation of the electronic data and a unique identifier and which is associated with the visual representation of the electronic data, for example, in PDF format. Additional embodiments involve receiving the user's digital signature by having the user input a digital certificate of the user stored on a physical device by inserting the physical device into a reader.

Additional objects, advantages and novel features of the invention will be set forth in part in the description which follows, and in part will become more apparent to those skilled in the art upon examination of the following, or may be learned from practice of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

At a high level, the methods and systems for embodiments of the invention involve, for example, storing a set of transactions, creating a digital receipt or representation of those transactions, and thereafter capturing an approval in the form of a digital signing against that receipt. Further, the entire process is performed end-to-end in a manner that establishes non-repudiation and proof at any given point that the data that a user has approved or digitally signed has not been tampered with throughout the process chain.

The traditional way of recording a signature against a set of data was to place the data in a document whereby the user could see the data in its entirety and have the user use a digital certificate to digitally sign the document which contained the exact data that was to be processed. According to an aspect of embodiments of the invention, a layer of abstraction, known as a digital hash, is inserted between what the user digitally signs and the data that is actually processed. Thus, what the user signs represents exactly mathematically the data that is processed through the usage of the digital hash, which is much smaller in size and consequently requires much less storage space than the data that is actually processed.

Figure 1:
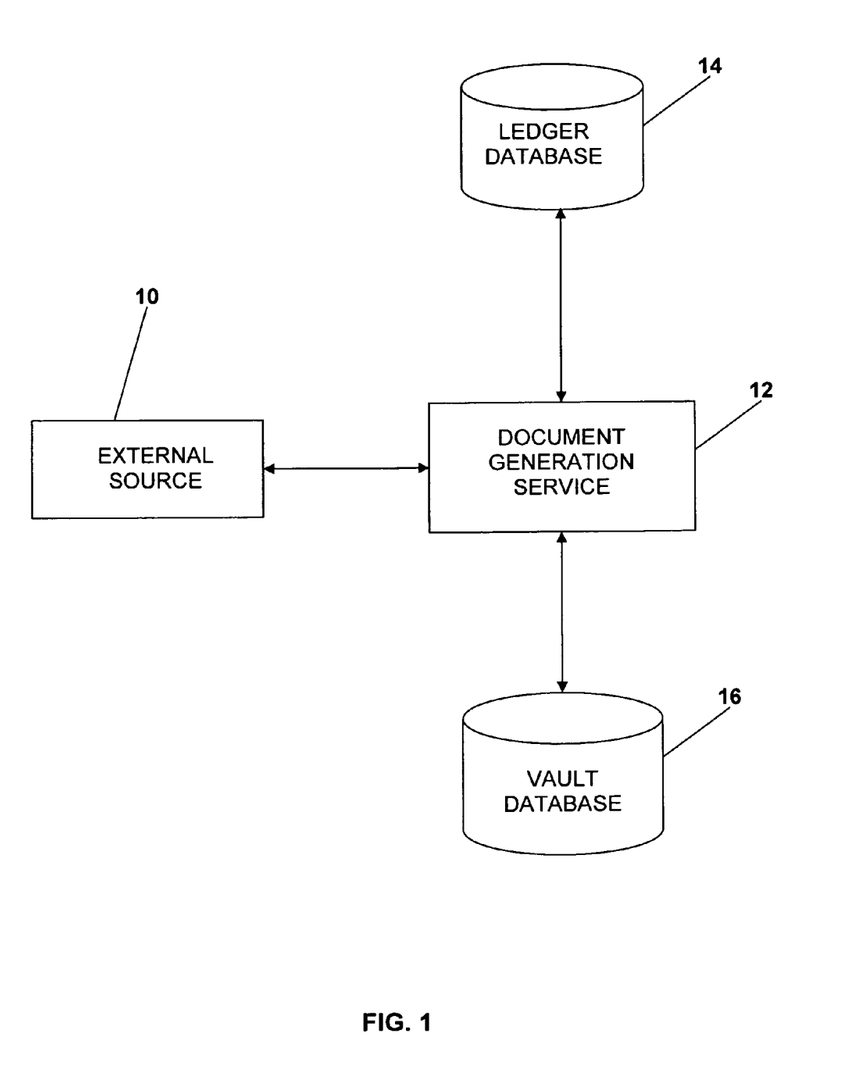
FIG. 1 is a schematic diagram that illustrates an overview example of key components and the flow of information between key components of a document generation aspect of embodiments of the invention.

FIG. 1 is a schematic diagram that illustrates an overview example of key components and the flow of information between key components of a document generation aspect of embodiments of the invention. Referring to FIG. 1, components of the document generation aspect include, for example, a document generation service 12 which receives transaction data from an external source 10 and which is associated with ledger database 14 and vault database 16 for storing data.

Figure 2:
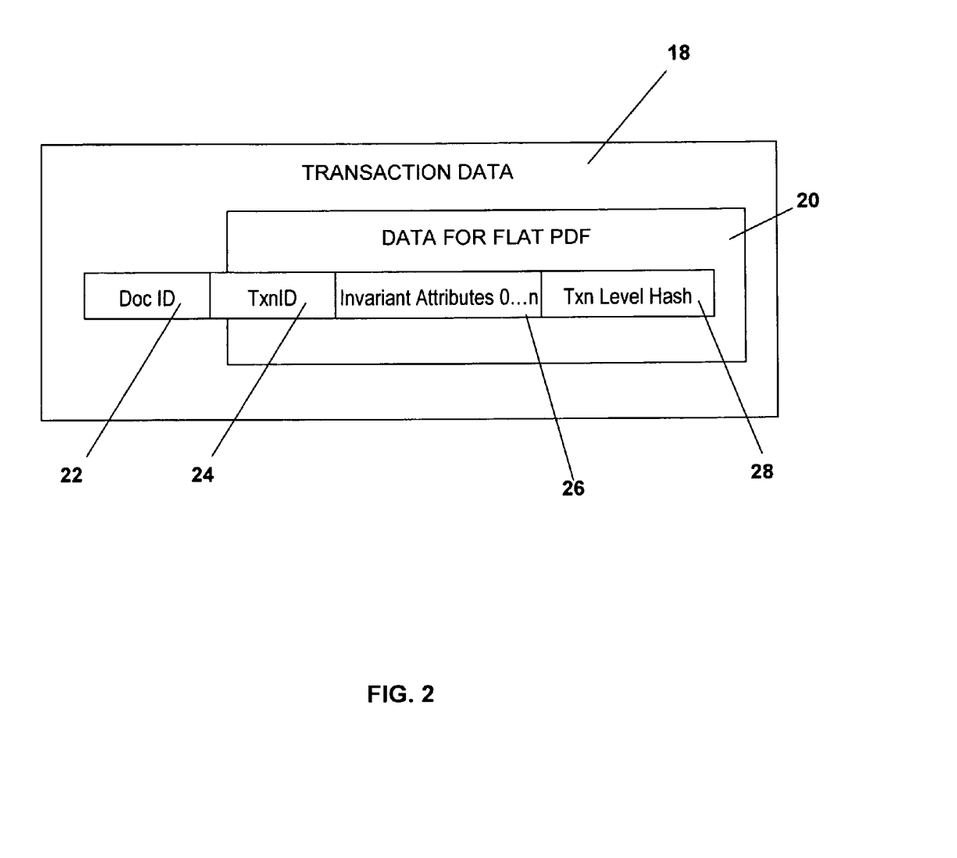
FIG. 2 is a schematic diagram that illustrates an example of transaction data storage, for example, in a ledger database for embodiments of the invention.

FIG. 2 is a schematic diagram that illustrates an example of transaction data storage, for example, in the ledger database 14 for embodiments of the invention. Referring to FIG. 2, transaction data storage in the ledger database 14 includes, for example, the transaction data 18, and data for a flat file 20, such as a PDF file, consisting of a document identifier 22, a transaction ID 24, invariant attributes of the data 26, and a transaction level hash 28.

Figure 3:
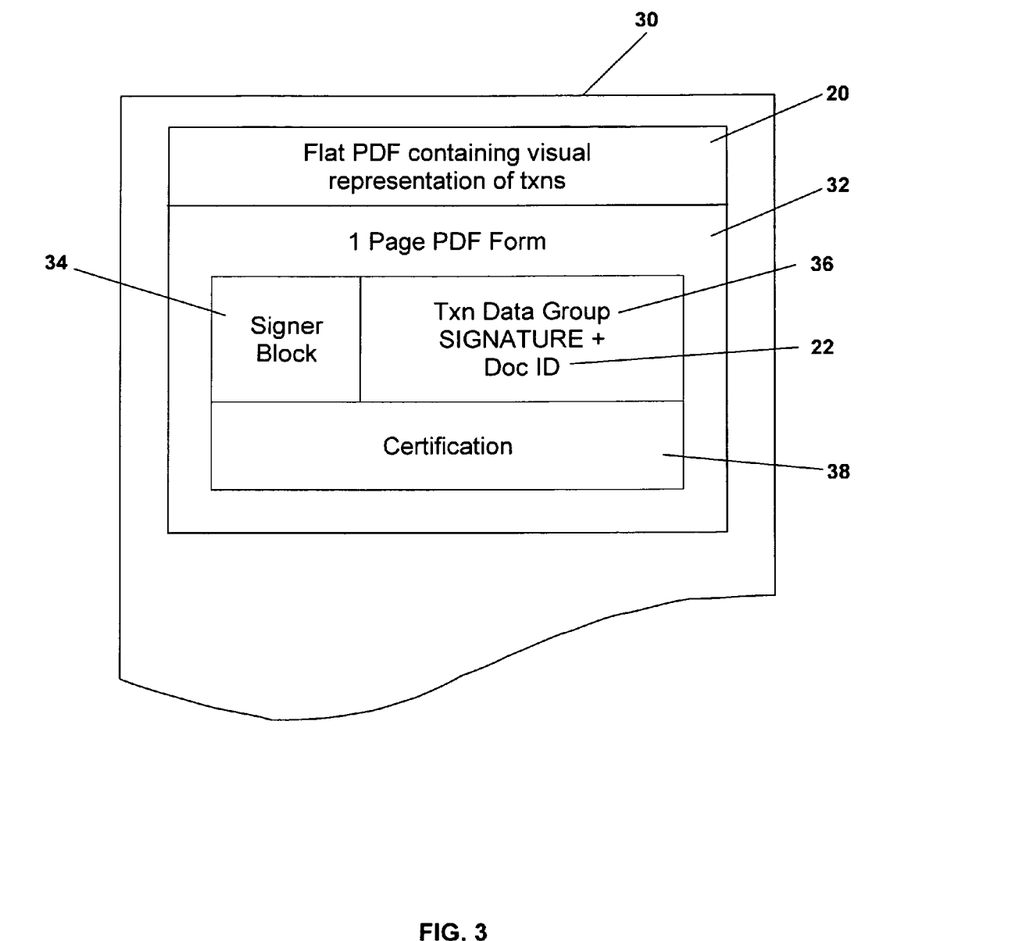
FIG. 3 is a schematic diagram that illustrates an example of a document generated according to the document generation aspect of embodiments of the invention.

FIG. 3 is a schematic diagram that illustrates an example of a document 30 generated according to document generation aspect of embodiments of the invention. Referring to FIG. 3, the document 30 includes, for example, the flat file 20, such as a PDF file, containing a visual representation of transaction data 18 and a one-page form 32, such as a PDF form, that includes a signer block 34, a transaction data group signature 36 that also includes the document identifier 22, and a certification 38.

An embodiment of the invention involves, for example, computing a hash against the data to be processed, inserting the computed hash into the actual document containing the data to be processed, and having the user digitally sign the hash along with a purely visual representation of the original data to be processed. It is proposed that having the user digitally sign the visual representation of the data to be processed along with the mathematical representation, i.e, the hash, is equivalent in a legally binding sense to having the user sign the original data.

Having the user digitally sign the hash along with a purely visual representation of the original data to be processed is a feature that distinguishes the process of embodiments of the invention from conventional methods of digitally signing documents. Thus, according to embodiments of the invention, the hash and the visual representation of the data to be processed are packaged together and digitally signed by the user, whereas the previous practice was to have the user digitally sign the actual data itself.

The act of digitally signing is typically performed by having the user input the user's digital certificate stored, for example, on a physical device such as USB token or a smart card, by inserting the physical device into a reader, whereupon the certificate is read by the machine and used to digitally sign the document. In embodiments of the invention, the hash and the visual representation of the data to be processed are packaged together and digitally signed as opposed to digitally signing the document itself.

In the example embodiments of the present invention, reference is made, for example, to the processing of payment transactions, but it is to be understood that the methods and systems for embodiments of the invention are equally useful in processing any other types of data, financial or otherwise, as well. Further, in the example embodiments, reference is made to a financial institution as the service provider, but it is likewise to be understood that service providers for embodiments of the invention can be any other suitable entities and are in no way limited to financial institutions.

In a currently available process in which a user digitally signs the document itself, the signing user is deemed to be held accountable for signing only what the user actually sees, i.e., the data that is being processed. Assume that a set of records to be processed represents, for example, 100,000 payments. It is self-apparent that such a set of records includes a huge amount of data. Embodiments of the invention reduce the size of the set of records by orders of magnitude by hashing the data and creating a purely visual representation, i.e., one that cannot itself be processed, while at the same time providing a non-repudiatable, legally binding obligation of a user who digitally signs the hash and visual representation of the data to be processed.

Aspects of embodiments of the invention involve the user digitally signing a visual representation of data along with a mathematical representation of the data and a sequence of verifications through which the signed visual and mathematical representations of the data can be tied back to the data that is actually processed. In embodiments of the invention, a visual representation of the document can be presented, for example, in PDF format.

A difference between a format, such as PDF format, and a format such as WORD format is that a WORD document has text that is actually physically within the document, while a PDF document that includes text has merely a visual representation of the text (e.g., similar to a photo or snapshot, albeit with some additional capabilities). In other words, instead of the ASCII text itself, a PDF document has, e.g., vector instructions around where to draw lines and place pixels and the like.

It will be appreciated that early development and use of formats such as the PDF format focused on visual representations of documents and that the inclusion, e.g., of ASCII text similar to a WORD file in PDF format is relatively new. It will be further appreciated that a PDF file containing ASCII text similar to a WORD file in PDF format is significantly greater in size than a PDF file containing data for the visual representation of the document. Thus, while it is possible to store the actual data in PDF format and use the stored PDF data itself to process transactions, such a process is impractical, unwieldy, and completely unworkable because the size of PDF files storing such data is simply too great.

The payment transaction data 18 in the example embodiment can be, e.g., payment instructions such as domestic wire transfers into local countries, ACH transfers, or possibly checks, and the payment instructions can be received, e.g., from a typical payments module within an enterprise resource planning (ERP) application. According to embodiments of the invention, packaging together and digitally signing the hash and the visual representation of the data to be processed occurs at the client side where a user actually approves the instructions prior to the data being sent for processing.

It is to be understood that while the example embodiment employs a visual representation of the data in PDF format, other embodiments can employ other suitable formats for visual representation of the data. Such suitable formats include, for example, any format that can visually represent data without requiring that the represented data be embedded in the format. Other suitable formats can include, for example, any format, whether text or image, in which data can be visually represented without requiring the underlying data to be present.

Suitable text formats can be analogized, for example, to a photograph of a page of an open book which is a visual representation of the text on the page (i.e., the pixels making up the representation) without the actual ASCII characters. Suitable image formats can include, for example, JPEG or TIFF, as long as a corresponding reader is provided to support digital signing. Other suitable formats can include, for example, WORD and EXCEL Spreadsheet.

A further aspect utilizing PDF format for embodiments of the invention involves employment of a PDF form. Assume, for example, 100 PDF pages that visually represent 100,000 transactions to be processed. In addition to those 100 pages, for example, at the end, embodiments of the invention employ a single page known as a PDF form, which is a different format than the first 100 pages. In embodiments of the invention, the PDF form contains a group level hash of the underlying data and also has a signature field to be used in digitally signing the overall 101 pages.

The hash function employed in embodiments of the invention allows a hash value to be computed on any data set or value of any size. Regardless of the size of the source data, it will result in a consistent size hash value output. For example, the hash computed on two documents of different sizes, such as the Bible and Webster's English Dictionary, yields a hash value of 128 characters for each document, regardless of the size of the documents.

An important aspect of the hash for embodiments of the invention is that if any single character in either of those two example documents is changed, the hash value computed for the changed document will be completely different. Thus, comparing the original hash value with the hash value computed on the same document with the changed character will reveal that the underlying data set was changed.

In embodiments of the invention, an external party 10 that provides, for example, transaction management and approval services for its users, sends data, such as transaction data 18, to a service provider, such as a financial institution, for processing. Before processing the data, the financial institution requires an approval in the form of a digital signature from a user, who can also be a client of the financial institution, against the received data. Thus, upon receiving the transaction data 18 from the external party 10, the financial institution presents the document consisting of the visual representation of the data packaged together with the hash of the data for digital signature by the user. Once the user digitally signs the document, the transaction is released by the financial institution for downstream processing.

Figure 4:
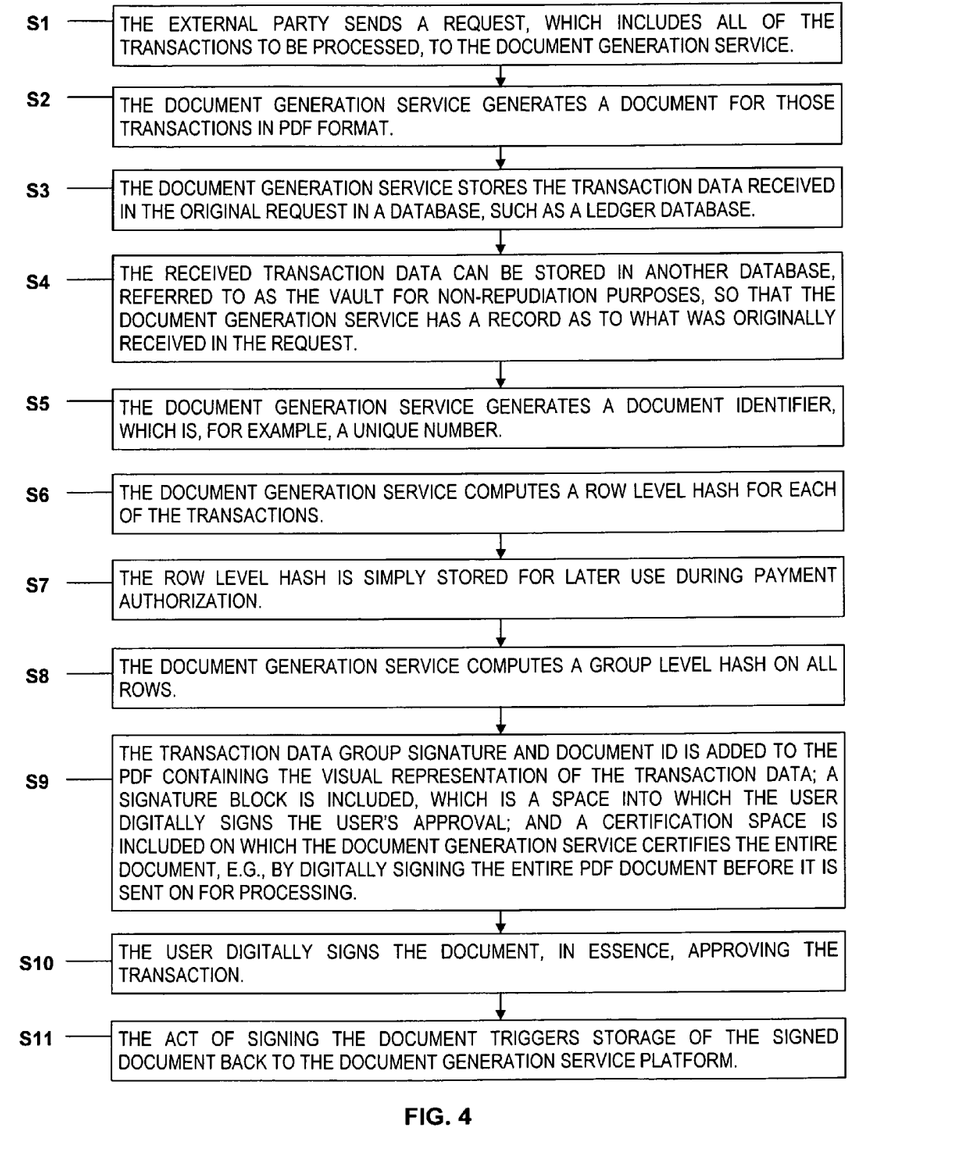
FIG. 4 is a flow chart that illustrates an example of the process of document generation for embodiments of the invention.

FIG. 4 is a flow chart that illustrates an example of the process of document generation for embodiments of the invention. As previously noted herein, while the example embodiment refers to the data relating to a payment transaction, but it is to be understood that the methods and systems for embodiments of the invention are equally useful in processing any other type of data, financial or otherwise, as well. Further, as also previously noted, while the example embodiment refers to the service provider as a financial institution, it is likewise to be understood that service providers for embodiments of the invention are in no way limited to financial institutions.

Referring to FIG. 4, at S1, the external party 10 sends a request, which includes all of the transactions to be processed for a user, to the document generation service 12. At S2, the document generation service 12 generates a document 30 for those transactions, for example, in PDF format. However, a PDF document that includes all of the transaction data 18 is too large to return to the external party. Therefore, at S3, the document generation service 12 stores the transaction data 18 received in the original request in a database, such as ledger database 14.

In addition, at S4, the received transaction data 18 can be stored in another database, referred to as the vault database 16, for non-repudiation purposes, so that the document generation service 12 has a record as to what was originally received in the request. The vault database 16 can be a "read-only" repository which is not available for use as an operational data store. After storing the transaction data 18, at S5, the document generation service 12 generates a document identifier 22, which is, for example, a unique number. Assume, for example, that the received request includes 100 rows. The document identifier 22 will be the same for all 100 rows which ties those rows together as a group as in the original request.

Referring further to FIG. 4, at S6, the document generation service 12 computes a row level hash 28 for each of the transactions. If there are 100 rows, each transaction may have, for example, 50 fields such as beneficiary, amount, currency code, and the like. An advantage of the hash, for example, is that regardless of the size of the fields, i.e., whether there are 50 or 100 fields in each transaction, it does not matter, because a hash will be computed off those fields and stored which will represent the data which the user is approving. At S7, the row level hash 28 is simply stored in the ledger database 14 for later use during payment authorization.

At S8, the document generation service 12 computes a group level hash 36 on all rows, so assuming 100 rows, the group level hash 36 is computed on 100 rows. In other words, the group level hash 36 is computed against all of the transaction data 18 received in the request, and that hash 36 is included into the PDF document 30. The group level hash 36 essentially represents mathematically the data in the received transactions. If any single byte of that data is later changed, e.g., if someone changes an amount field from $10.00 to $1,000,000, the group level hash 36 would no longer be valid. In other words, the hash of the changed data would no longer match the hash value of the original data.

Referring again to FIG. 4, at S9 the transaction data group signature 36 and document ID 22 is added to the PDF document 20 containing the visual representation of the transaction data 18. In addition, a signature block 34 is included, which is a space into which a user digitally signs the user's approval. Further, a certification space 38 is included on which the document generation service 12 certifies the entire document 30, e.g., by digitally signing the entire PDF document 30 before it is sent on for processing.

Thus, the PDF document 30 contains the digital representation of the transaction 20 along with a single item of data which is the group level hash 36, the document identifier 22, a signature block 34 for the user to digitally sign, and a digital signature block 38 on the entire document which enables a recipient of the PFD document 30 to verify that the document has not been tampered with since it left the document generation service 12.

Referring once more to FIG. 4, after the document 30 is generated and before it is stored, at S10, the user digitally signs the document 30, in essence, approving the transaction. The act of signing the document 30 triggers storage of the signed document 30 back to the platform of the document generation service 12 at S11. In other words, the same PDF document 30 that was sent by the document generation service 12 for the user's digital signature is returned to the document generation service 12 with the addition of the user's digital signature computed using the user's private key on the user's digital certificate.

Figure 5:
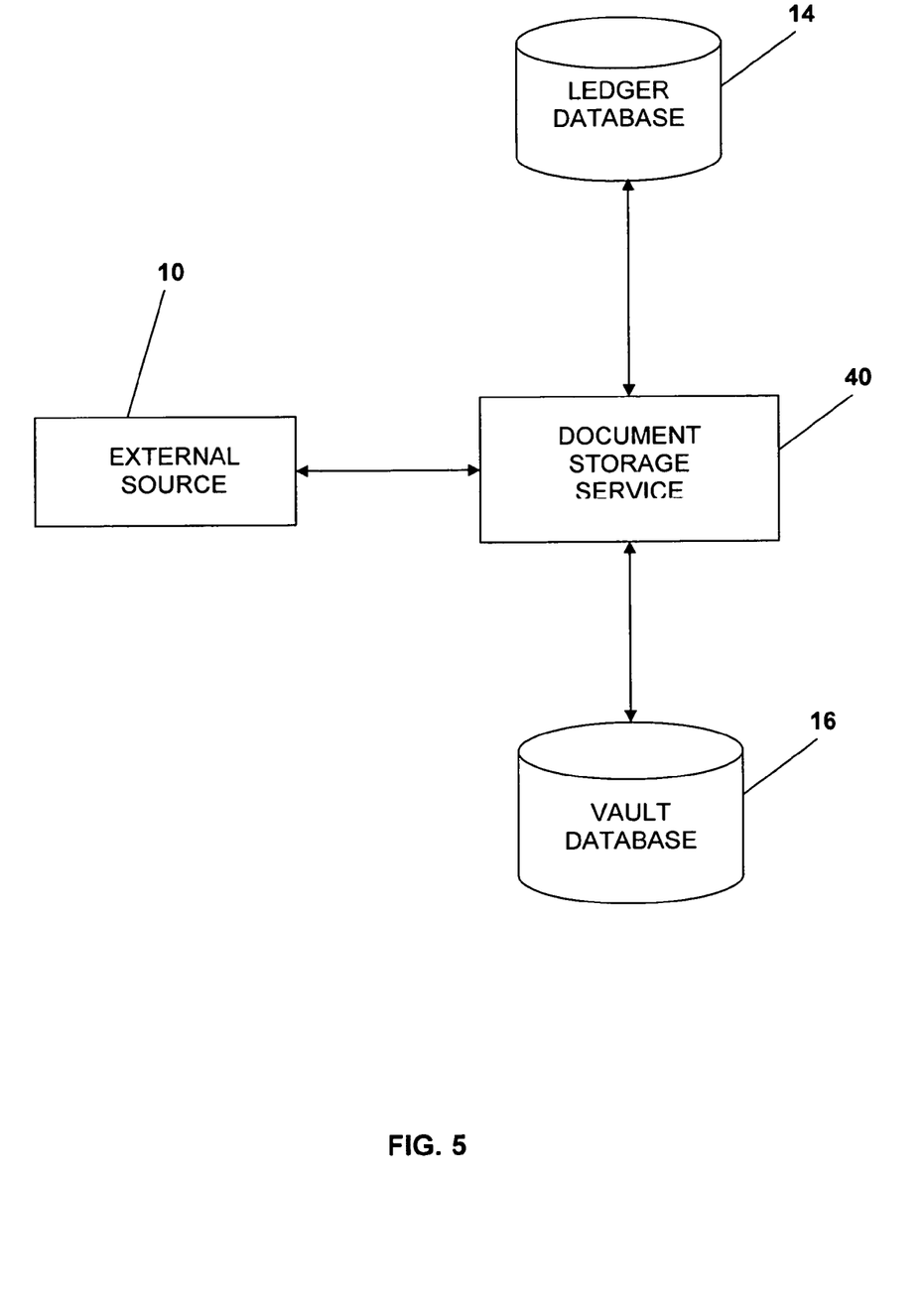
FIG. 5 is a schematic diagram that illustrates an overview example of key components and the flow of information between key components of a document storage aspect of embodiments of the invention.

FIG. 5 is a schematic diagram that illustrates an overview example of key components and the flow of information between key components of a document storage aspect of embodiments of the invention. Referring to FIG. 5, components of the document storage aspect include, for example, a document storage service 40 which receives storage requests from the external source 10 and which is likewise associated with the ledger database 14 and vault database 16.

Figure 6:
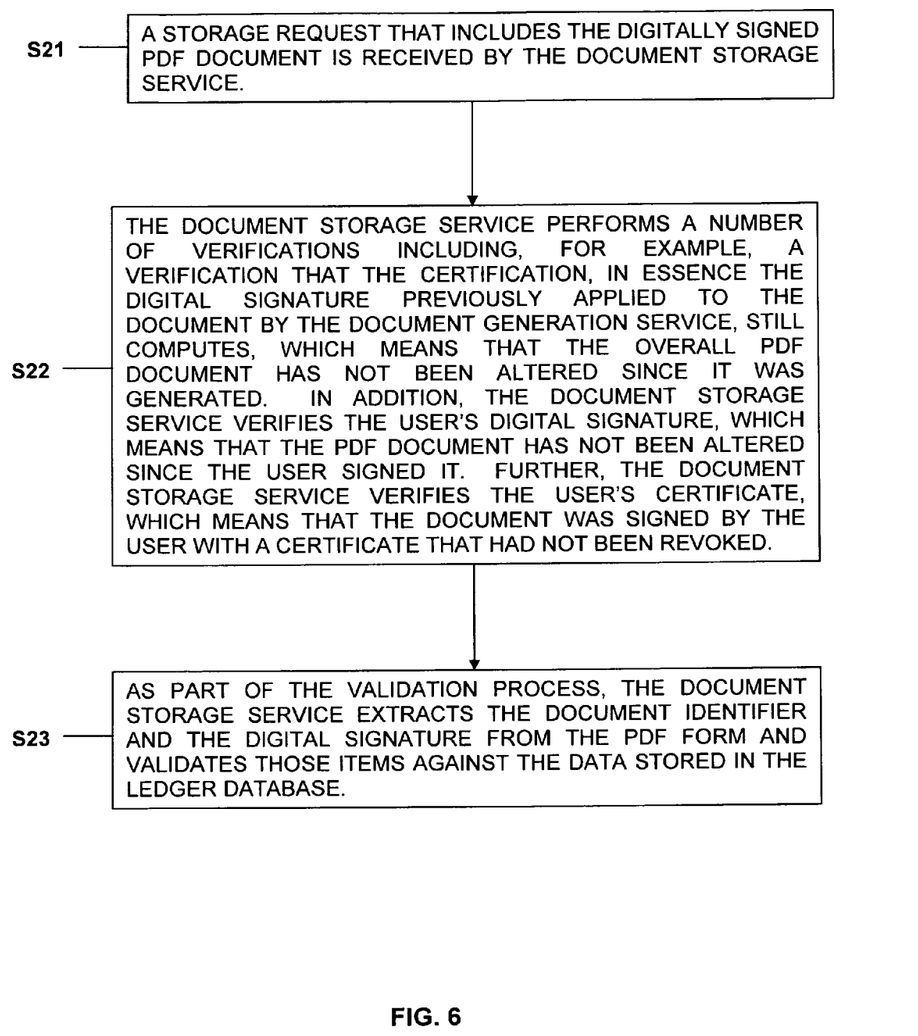
FIG. 6 is a flow chart that illustrates an example of the document storage process for embodiments of the invention.

FIG. 6 is a flow chart that illustrates an example of the document storage process for embodiments of the invention. Referring to FIG. 6, when a storage request that includes the digitally signed PDF document 30 is received by the document storage service 40 at S21, the document storage service 40 performs a number of verifications at S22 including, for example, a verification that the certification 38, in essence the digital signature previously applied to the document by the document generation service 12, still computes, which means that the overall PDF document 30 has not been altered since it was generated. In addition, the document storage service 40 verifies the user's digital signature 34, which means that the PDF document 30 has not been altered since the user signed it. Further, the document storage service 40 verifies the user's certificate, which means that the document was signed by the user with a certificate that had not been revoked.

As part of the validation process, at S23, the document storage service 40 extracts the document identifier 22 and the digital signature 36 from the PDF form 32 and validates those items against the data stored in the ledger database 14. For example, assuming 100 transactions, the document storage service 40 matches the document identifier 22 to the 100 transactions stored in the ledger database 14 and verifies that the digital signature applied by the document generation service 12 still matches what the document storage service 40 computed, which means that the data in the ledger database 14 has not been tampered with since the PDF document 30 was created.

It is to be understood that digital signatures according to embodiments of the invention employ public key infrastructure (PKI) with a certificate that includes public and private keys. The private key is used to digitally sign information by the certificate holder, and the public key is used by another party to verify the certificate holder's digital signature on the information. It is to be further understood that verification of a certificate holder's certificate is accomplished via On-Line Certificate Status Protocol (OCSP) through a certificate authority which issued the certificate for the certificate holder.

To recap, according to embodiments of the invention, a request for data is received by the document generation service 12 from an external source 10 for the user and the data is stored. Assuming, for example, 100,000 transactions, a digital representation 20 of the data is computed that is much smaller than it would have been if all 100,000 transactions were included and sent back to the user. In addition, embodiments of the invention create a mechanism by which the user can be assured that what the user signs is what was originally received by the document generation service 12 for the user. Further, embodiments of the invention create a mechanism by which the document generation service 12 can be assured that the data sent back to the user and signed by the user has not been altered throughout the end-to-end process.

Embodiments of the invention distinguish between non-invariant attributes and invariant attributes 26. For example, assume that when a transaction is received, it has 50 fields. Typically, some of those fields (referred to as non-invariant attributes) can change for legitimate reasons but others of those fields (referred to as invariant attributes 26), such as a monetary amount, should never change. For example, if a transaction involves a request for a $100 wire transfer, the amount should always be $100 and should never change. In order to avoid holding up processing because of a change in one or more non-invariant fields, the non-invariant fields are simply culled, and the items of data against which the hash is computed include only the invariant attributes 26.

Figure 7:
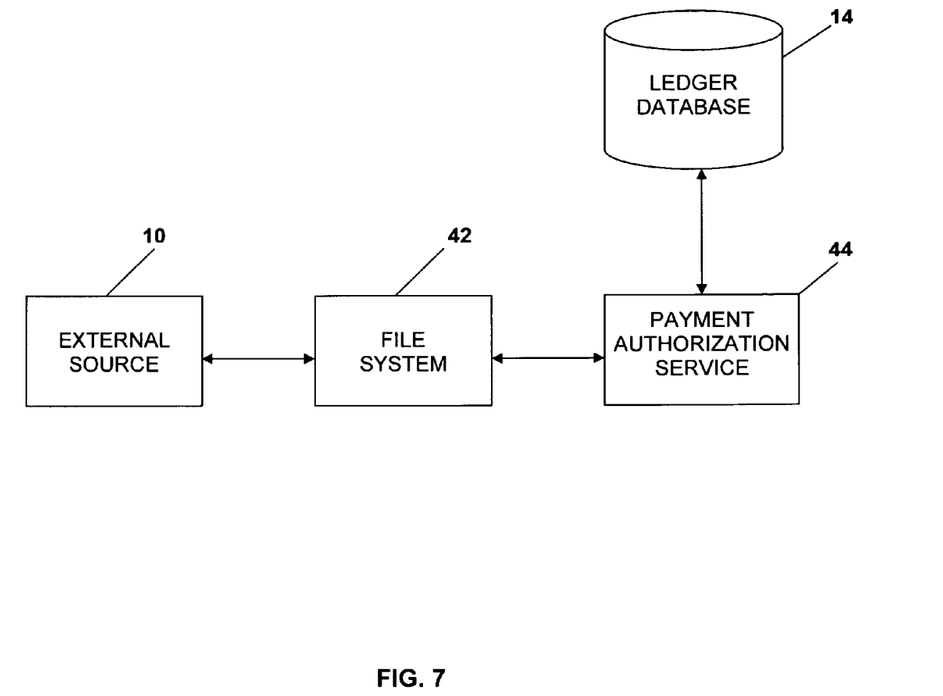
FIG. 7 is a schematic diagram that illustrates an overview example of key components and the flow of information between key components of a payment authorization aspect of embodiments of the invention.

FIG. 7 is a schematic diagram that illustrates an overview example of key components and the flow of information between key components of a payment authorization aspect of embodiments of the invention. Referring to FIG. 7, components of the payment authorization aspect include, for example, a file system 42 via which a payment authorization service 44 receives files from the external source 10. The payment authorization service 44 is likewise associated with the ledger database 14 and vault database 16.

Figure 8:
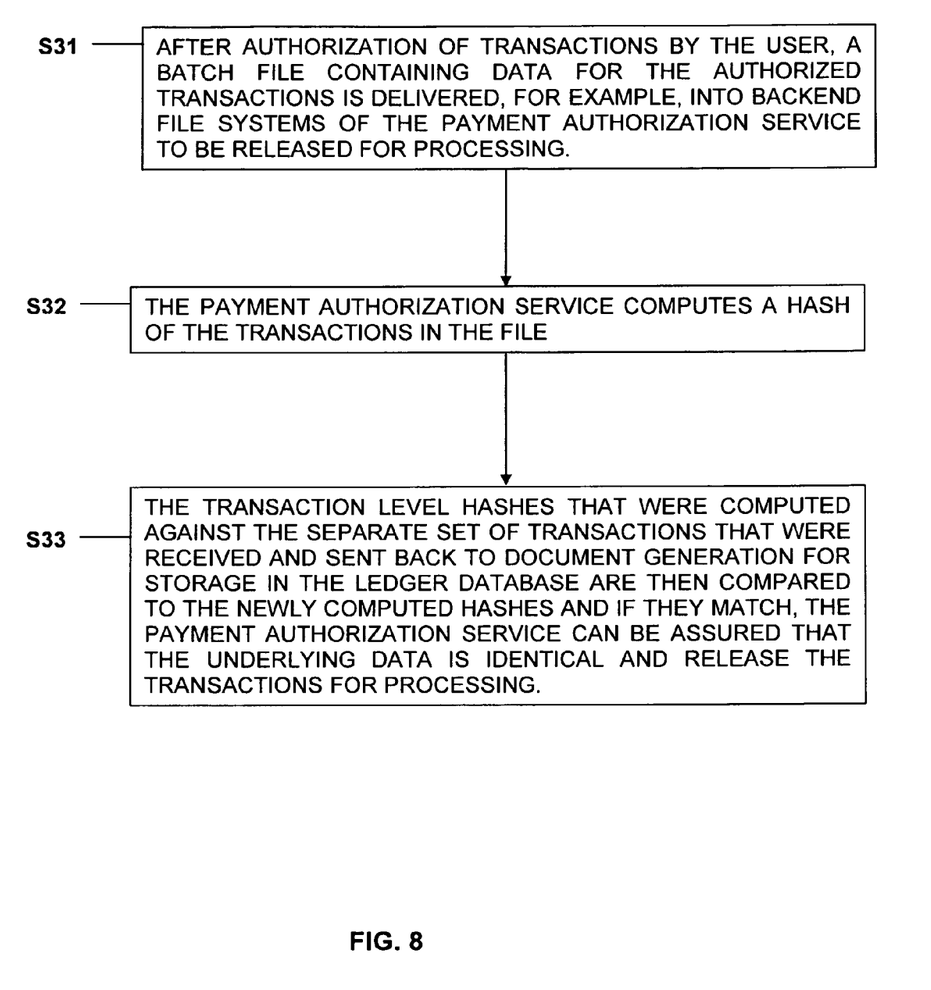
FIG. 8 is a flow chart that illustrates an example of the payment authorization process for embodiments of the invention.

FIG. 8 is a flow chart that illustrates an example of the payment authorization process for embodiments of the invention. Referring to FIG. 8, in the secure payment authorization process, after authorization of transactions by the user, at S31, a batch file containing data for the authorized transactions is delivered, for example, into backend file systems 42 of the payment authorization service 44 to be released for processing. Before releasing the transactions for processing, the payment authorization service 44 must confirm, typically within a very short window of time, that what was delivered is not materially different from what was originally received and digitally signed by the user with the user's certificate.

In order to accomplish this in the time available, at S32, the payment authorization service 44 computes a hash of the transactions in the file. Thus, if the file contains 100 transactions, 100 hashes are computed. At S33, the transaction level hashes 28 that were computed against the separate set of transactions that were received and sent back to the document generation service 12 for storage in the ledger database 14 are then compared to the newly computed hashes and if they match, the payment authorization service 44 can be assured that the underlying data is identical and release the transactions for processing.

The payment authorization service 44 digitally signs the overall visual representation 20 and the group level hash 36 as part of the certification before returning the document for the user's signature 34. Thus, the payment authorization service 44 certifies the entire document, which the flat file visually represents, by signing in the signature space 36, which is in essence an encrypted hash. Following document generation and before document storage, the user actually digitally signs both, in essence authorizing the transactions to be processed.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer-implemented method for creating a digital receipt for electronic data, comprising:
   receiving, via a computer, a request from an external party which consists at least in part of electronic data for a plurality of transactions to be processed for a user;
   generating, using the computer, a unique document identifier for the received request and a visual representation of the electronic data for the plurality of transactions in a pre-defined format that visually represents the data without requiring that the represented data be embedded in the format;
   computing, using the computer, a row level hash value for each one of the plurality of transactions in the electronic data and storing, using the computer, the row level hash value for each one of the plurality of transactions with the received transaction data;
   computing using the computer, a group level hash value for all of the plurality of transactions in the electronic data and generating, using the computer, a form in the pre-defined format and consisting at least in part of the group level hash value for all of the plurality of transactions in the electronic data and the unique document identifier;
   associating, using the computer, the form in the pre-defined format consisting at least in part of the group level hash value for all of the plurality of transactions in the electronic data and the unique document identifier with the visual representation of the electronic data;
   sending, using the computer, the form in the pre-defined format consisting at least in part of the group level hash value for all of the plurality of transactions in the electronic data and the unique document identifier associated with the visual representation of the electronic data to the user with a request for addition of the user's digital signature using a private key of the user; and
   receiving, using the computer, the form in the pre-defined format consisting at least in part of the group level hash value for all of the plurality of transactions in the electronic data and the unique document identifier and the associated visual representation of the electronic data with the user's digital signature added to evidence the user's approval of the represented electronic data.

2. The method of claim 1, wherein receiving the transaction data from the external party further comprises receiving payment instructions from a payments module for processing for the user.

3. The method of claim 2, wherein receiving the payment instructions further comprises receiving payment instruction data consisting of at least one of wire transfers, ACH transfers, or checks from the payments module for processing for the user.

4. The method of claim 1, wherein the pre-defined format further comprises PDF format.

5. The method of claim 1, wherein computing the hash values for the electronic data further comprises computing the hash values for the electronic data exclusively on invariant attribute fields.

6. A non-transitory computer-readable storage medium with an executable program for creating a digital receipt for electronic data stored thereon, wherein the program instructs a microprocessor to perform the following steps:
   receiving a request from an external party which consists at least in part of electronic data for a plurality of transactions to be processed for a user;
   generating a unique document identifier for the received request and a visual representation of the electronic data for the plurality of transactions in a pre-defined format that visually represents the data without requiring that the represented data be embedded in the format;
   computing a row level hash value for each one of the plurality of transactions in the electronic data and storing, using the computer, the row level hash value for each one of the plurality of transactions with the received transaction data;
   computing a group level hash value for all of the plurality of transactions in the electronic data and generating, using the computer, a form in the pre-defined format consisting at least in part of the group level hash value for all of the plurality of transactions in the electronic data and the unique document identifier;
   associating the form in the pre-defined format consisting at least in part of the group level hash value for all of the plurality of transactions in the electronic data and the unique document identifier with the visual representation of the electronic data;
   sending, using the computer, the form in the pre-defined format consisting at least in part of the group level hash value for all of the plurality of transactions in the electronic data and the unique document identifier associated with the visual representation of the electronic data to the user with a request for addition of the user's digital signature using a private key of the user; and
   receiving the form in the pre-defined format consisting at least in part of the group level hash value for all of the plurality of transactions in the electronic data and the unique document identifier and the associated visual representation of the electronic data with the user's digital signature added to evidence the user's approval of the represented electronic data.

7. A machine for creating a digital receipt for electronic data, comprising:
   a microprocessor couple to a memory, wherein the microprocessor is programmed to create a digital receipt for electronic data by:
   receiving a request from an external party which consists at least in part of electronic data for a plurality of transactions to be processed for a user;
   generating a unique document identifier for the received request and a visual representation of the electronic data for the plurality of transactions in a pre-defined format that visually represents the data without requiring that the represented data be embedded in the format;
   computing a row level hash value for each one of the plurality of transactions in the electronic data and storing, using the computer, the row level hash value for each one of the plurality of transactions with the received transaction data;

computing a group level hash value for all of the plurality of transactions in the electronic data and generating, using the computer, a form in the pre-defined format consisting at least in part of the group level hash value for all of the plurality of transactions in the electronic data and the unique document identifier;

associating the form in the pre-defined format consisting at least in part of the group level hash value for all of the plurality of transactions in the electronic data and the unique document identifier with the visual representation of the electronic data;

sending, using the computer, the form in the pre-defined format consisting at least in part of the group level hash value for all of the plurality of transactions in the electronic data and the unique document identifier associated with the visual representation of the electronic data to the user with a request for addition of the user's digital signature using a private key of the user; and receiving the form in the pre-defined format consisting at least in part of the group level hash value for all of the plurality of transactions in the electronic data and the unique document identifier and the associated visual representation of the electronic data with the user's digital signature added to evidence the user's approval of the represented electronic data.

\* \* \* \* \*